United States Patent [19]
Blonder et al.

[11] Patent Number: 5,920,307
[45] Date of Patent: Jul. 6, 1999

[54] SYSTEM FOR DIRECTLY SENSING THE ORIENTATION OF A TRACK BALL

[75] Inventors: Greg E. Blonder, Summit; George Knoedl, Jr., Milford, both of N.J.

[73] Assignee: Lucent Technologies, Inc., Murray Hill, N.J.

[21] Appl. No.: 08/392,007

[22] Filed: Feb. 21, 1995

[51] Int. Cl.⁶ .................................................. G09G 5/08
[52] U.S. Cl. ........................................ 345/167; 345/164
[58] Field of Search .................... 345/167, 156, 345/157, 163; 341/22; 324/660, 662, 686; 178/18.02, 19.03; 321/33

[56] References Cited

U.S. PATENT DOCUMENTS

| | | | |
|---|---|---|---|
| Re. 34,741 | 9/1994 | Andermo | 324/690 |
| 3,625,083 | 12/1971 | Bose | 345/167 |
| 3,891,285 | 6/1975 | Atkinson | 48/10 |
| 4,364,035 | 12/1982 | Kirsch | 340/710 |
| 4,420,754 | 12/1983 | Andermo | 340/870.37 |
| 4,546,347 | 10/1985 | Kirsch | 340/710 |
| 4,607,173 | 8/1986 | Knoedl, Jr. | 307/291 |
| 4,765,064 | 8/1988 | Maeda | 33/172 E |
| 4,798,004 | 1/1989 | Suzuki | 33/172 E |
| 4,879,508 | 11/1989 | Andermo | 324/61 R |
| 4,991,125 | 2/1991 | Ichikawa | 364/560 |
| 5,023,559 | 6/1991 | Andermo | 324/662 |
| 5,049,824 | 9/1991 | Suzuki et al. | 324/660 |
| 5,053,715 | 10/1991 | Andermo | 324/662 |
| 5,104,225 | 4/1992 | Masreliez | 356/356 |
| 5,136,125 | 8/1992 | Russell | 178/19 |
| 5,187,330 | 2/1993 | Holcroft | 178/18 |
| 5,204,674 | 4/1993 | Holben | 340/870.25 |
| 5,248,961 | 9/1993 | Fujii | 345/167 |
| 5,270,711 | 12/1993 | Knapp | 345/174 |
| 5,272,476 | 12/1993 | McArthur et al. | 340/870.13 |
| 5,298,689 | 3/1994 | Mohri et al. | 178/19 |
| 5,304,937 | 4/1994 | Meyer | 324/686 |
| 5,530,456 | 6/1996 | Kokubo | 345/175 |
| 5,583,541 | 12/1996 | Solhjell | 345/163 |

Primary Examiner—Michael Lee

[57] ABSTRACT

A track ball device includes a ball having a pattern of first conductive features and a socket into which the ball rotatably sits, the socket having a pattern of second conductive features. Also disclosed is a sensing array system for determining relative motion including a first substrate having a plurality of interstitially arranged electrodes provided thereon. A second substrate has a plurality of transfer electrodes provided thereon. The first and second substrates are movable relative to each other, and the plurality of interstitially arranged electrodes selectively operate as driving electrodes for providing a plurality of signals to the sensing array and as collecting electrodes for collecting signals capacitively transferred from the driving electrodes by the transfer electrodes. The sensing array is useful in a battery operated track ball device, a mouse or other device that must be able to determine relative motion over two degrees of freedom.

60 Claims, 11 Drawing Sheets

SYSTEM FOR DIRECTLY SENSING THE ORIENTATION OF A TRACK BALL

BACKGROUND OF THE INVENTION

1. Field of the Invention

The present invention relates to a track ball device and, more particularly, to an electrostatic sensing scheme and circuit for directly sensing orientation of a track ball.

2. Description of the Related Art

A track ball, like a mouse or joy stick, controls the position of a cursor on a computer screen. The track ball unit stays in one place, and the ball is manually rotated for positioning the cursor.

A typical track ball unit is described in U.S. Pat. No. 5,248,961 and consists of a ball rotatably arranged in a case. A portion of the ball protrudes from an opening in the top of the case. An x-axis driven roller and a y-axis driven roller are arranged in the case at right angles to each other and are frictionally coupled with the ball. Rotary encoders are affixed to the shafts of the rollers. As the ball is rotated, the x-axis and y-axis rollers and corresponding encoders are driven in accordance with the components of rotation in the x and y directions. Typically, the rotary encoders are optical encoders including a light shielding plate and light emitting and receiving elements. The light shielding plate consists of a plate having a predetermined pattern of slits and is mounted on the shaft of each of the x-axis and y-axis driven rollers. A light emitting element and a light receiving element are disposed opposite each other across each of the light shielding plates. Alternative arrangements include the use of magnetic type encoders or mechanical type encoders in place of the optical encoders.

One disadvantage of these typical track ball units is that they require many mechanical parts including moving parts, flexing parts, friction rollers, etc. Accordingly, there are many parts that tend to foul, wear out or break.

Sun Microsystems Computer Corp. manufactures a direct-sensing optical mouse with no moving parts except for the mouse body itself. For example, see U.S. Pat. Nos. 4,364,035 and 4,546,347. The mouse body rides over a reflective pad with a cross-hatch pattern printed on it. A disadvantage of this system is that it fails when the mouse body is turned askew to the cross-hatch pattern or the reflective pads gets scratched or dirty.

In addition, the power requirements for commercially available optical sources and detectors limits the use of optical sensors in a battery operated track ball device.

U.S. Pat. No. 5,049,824 relates to a phase discrimination type electrostatic capacity detector for use as a displacement detector and a length measuring device. A first electrode plate has transmitting electrode elements and a receiving electrode oriented parallel to the transmitting electrodes. A second electrode plate has a plurality of coupling electrodes and a plurality of earth electrodes disposed alternately therewith. The first electrode plate is mounted on a stationary body of a dial gauge type length measuring instrument. The second electrode plate is mounted on a movable sliding member. By applying an electric signal to respective transmitting electrodes, the amount of displacement of the sliding member with respect to the stationary body can be detected. However, although such a device is useful for determining displacement in a linear one-dimensional direction, it is not particularly useful in a device that must measure displacement in a two dimensional plane or surface.

Accordingly, there is a need to overcome the above-noted problems associated with the prior art.

SUMMARY OF THE INVENTION

An embodiment of the present invention provides a track ball device having two mechanical parts, plus supporting electronic circuitry. The only moving part is the ball. A socket in which the ball rides, includes a low friction bearing surface and a pattern of conductive features forming an electrostatic motion sensing scheme. The ball, also having a pattern of conductive features, rides in the socket. Orientation of the ball, and therefore its motion, can be detected from changes in registration of the ball's pattern with respect to the socket's pattern. Since electrostatic sensing is used to determine orientation of the ball, the power requirements are relatively small. The device can therefore be used as a battery operated track ball device.

Accordingly, the present invention consists of a track ball device including a ball having a pattern of first conductive elements and a socket into which the ball rotatably sits, the socket having a pattern of second conductive elements. The present invention also relates to a sensing array system for determining relative motion. The system includes a first substrate having a plurality of interstitially arranged electrodes provided thereon. A second substrate has a plurality of transfer electrodes provided thereon. The first and second substrates are movable relative to each other. The plurality of interstitially arranged electrodes selectively operate alternatively as driving electrodes for providing a plurality of signals to the sensing array or as collecting electrodes for collecting signals capacitively transferred by the transfer electrodes from the driving electrodes.

BRIEF DESCRIPTION OF THE DRAWINGS

So that one skilled in the art to which the subject invention appertains will better understand how to practice the present invention, preferred embodiments of the invention will be described in detail below with reference to the drawings wherein.

DESCRIPTION OF THE PREFERRED EMBODIMENTS

Figure 1A:
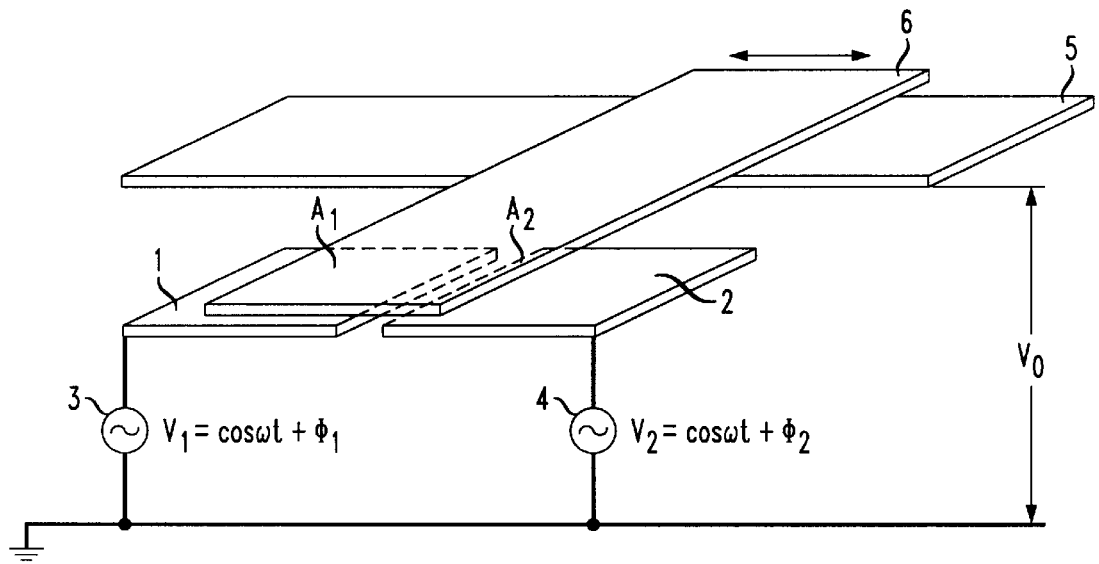
FIGS. 1A and 1B are diagrams illustrating the electrostatic sensing principle.
Figure 1B:
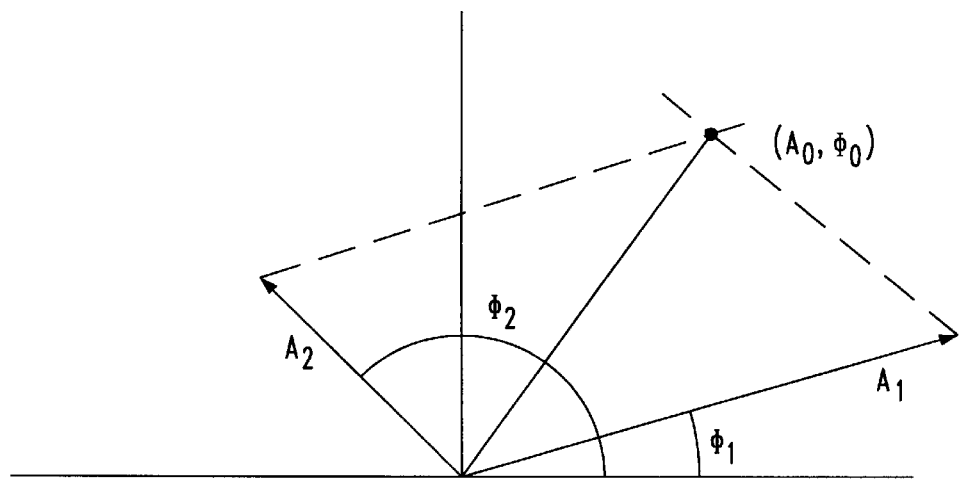

Referring now in specific detail to the drawings, in which like reference numbers identify similar or identical elements, the electrostatic sensing principle used in the present invention can be conceptualized by reference to FIG. 1. As shown in FIG. 1A, electrodes 1 and 2 are driven by signal generators 3 and 4, respectively, with electric signals $V_1$ and $V_2$ having the same amplitude but different phases. A signal collected by electrode 6 is, by Kirchoff's laws, a weighted average of the relative capacitances between electrode 6 and each of electrodes 1 and 2. The collected signal is proportional to the relative area of overlap $A_1$ and $A_2$ of electrode 6 to each of electrodes 1 and 2. Electrode 6 acts as a free floating transfer electrode, capacitively transferring the collected signal to collection electrode 5. If the signals supplied by signal generators 3 and 4 are sinusoids having the same frequency but differing in phase, as transfer electrode 6 is moved relative to electrodes 1 and 2 (as shown by arrows), the phase of the collected signal $V_0$ will be continuously variable and proportional to the relative position of transfer electrode 6 with respect to electrodes 1 and 2, as depicted in FIG. 1B. Electrodes 1 and 2 are referred to as "driving electrodes", electrode 6 is referred to as a "transfer electrode" and electrode 5 is referred to as a "collection electrode".

The electrostatic sensing scheme allows relative motion between transfer electrode 6 and driving electrodes 1 and 2 to be resolved without any electrical connection to transfer electrode 6. Accordingly, transfer electrode 6 can be provided on a freely movable object, such as a track ball. Driving electrodes 1 and 2 and collection electrode 5 can then be provided in a socket into which the track ball sits. By providing a periodic pattern of transfer electrodes on the surface of the ball and by providing properly arranged segments or strings of driving and collecting electrodes in a finite sensing array in the socket, relative motion of the ball can be ascertained.

Many considerations are involved in determining appropriate shape, size and layout of the electrode pattern for both the ball and the socket. One very important consideration is to design a transfer electrode pattern for the ball surface and a sensing array pattern for the socket that are tolerant of changes in orientation of the ball within the socket. The ball must be allowed to rotate freely within the socket while maintaining sensitivity over any possible pattern registration. It is also preferable that the socket and sensing array each be of a simple, singular construction, to simplify manufacture and dependability. Accordingly, to still allow the ball to be set into the socket, the ball preferably should not be more than half enclosed by the socket. The sensing array provided on the socket should be capable of maintaining sensitivity while having access to only half of the ball's surface at any given time, without any dead zones. To maintain sensitivity to movement at all times, at least one transfer electrode (also referred to as a "spot") on the ball must lie within the sensing array provided on the socket, at all times.

Noise considerations also play an important role in determining the design of the electrode patterns on both the ball and the socket. Regarding the sensing array pattern on the surface of the socket, electric flux linkage may cause coupling of a drive signal directly from the drive electrodes onto the collection electrodes, thus overwhelming the collected signal having the desired phase information. One solution for reducing the amount of direct signal coupling is to embed the sensing array in a grounded shielding mesh. Any remaining residual coupling of the drive signal can be reduced or removed by proper electrical balancing of the sensing array and by using specific detector circuitry which will be discussed in more detail below.

Since the device will be used in an electrically hostile environment caused by video displays for example, to avoid coupling noise from the user's hand which is in contact with the ball onto the transfer electrodes provided on the ball, the transfer electrodes should preferably be galvanically isolated from each other. This also minimizes radiation of EMI caused by the excitation signal and helps signal transfer efficiency.

Figure 2A:
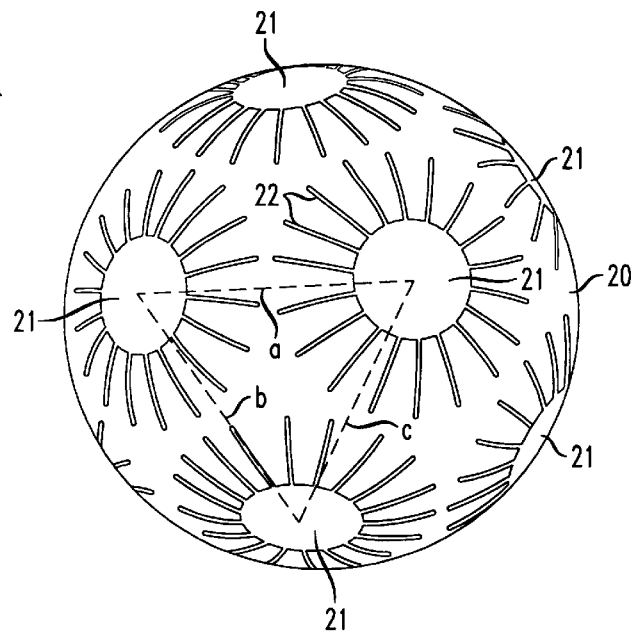
FIG. 2A is an illustration of a track ball having a circular shaped conductive pattern according to an embodiment of the present invention and FIG. 2B is a pentagonal shaped conductive pattern according to another embodiment of the present invention.

A preferred embodiment of the present invention will now be described with reference to FIGS. 2A, 2B and 3. A track ball according to a preferred embodiment of the present invention is shown in FIG. 2A. The track ball consists of a spherical ball 20 including transfer electrode spots 21. Each transfer electrode spot 21 has a circular shape having spikes or spokes 22 extending therefrom.

Figure 3:
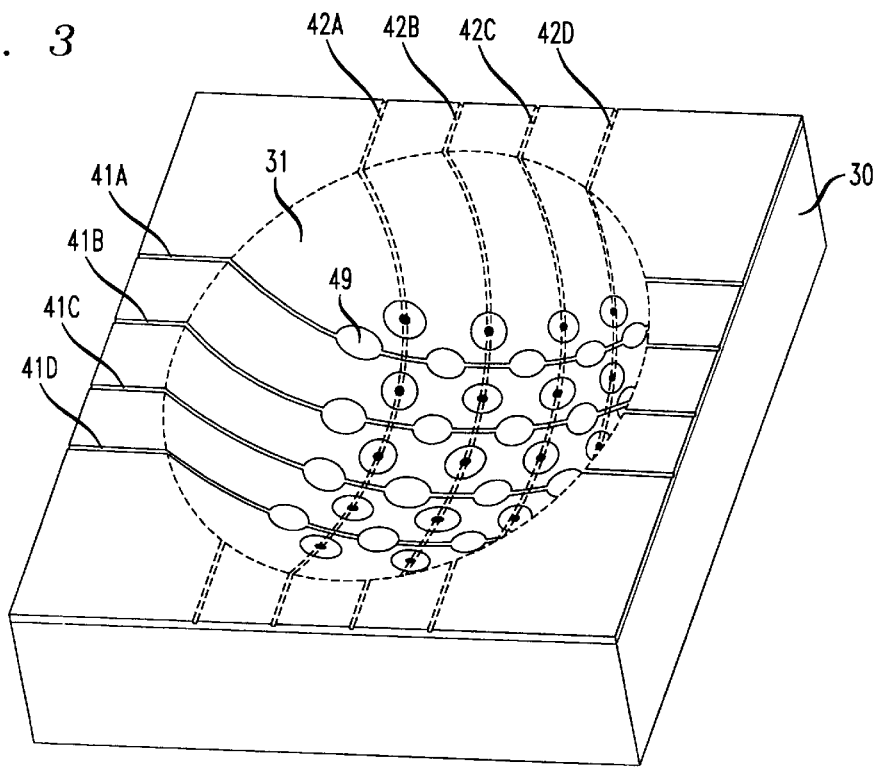
FIG. 3 is an illustration of a track ball socket having a conductive pattern according to an embodiment of the present invention.

A socket member in which the track ball sits, according to a preferred embodiment of the present invention, is depicted in FIG. 3. The socket member consists of a substrate 30 having a hemispherical hollow portion 31. Strings of interstitially arranged electrodes 41A–41D and 42A–42D are provided on the surface of the socket to form a sensing array. Each string of electrodes includes a series of electrode pads 49. The socket includes a low friction bearing surface on which the track ball rides. The bearing surface maintains a distance of approximately 0.002" between the transfer electrodes on the surface of the ball and the sensing array provided on the surface of the socket.

Referring to FIG. 2A, the diameter of each transfer electrode spot 21 should be broad enough to span the gap on either side of any driven string of electrodes. To avoid noncontinuous sensitivity to motion, the size of the transfer electrode spot should be chosen so that the leading edge of the transfer electrode spot begins to overlap the next electrode string and couple its signal just as the trailing edge of the transfer electrode spot clears the electrode string it is exiting. Transfer electrode spots having a diameter that just bridges across two, three or four electrode strings are optimal for this purpose, with the diameter that bridges three strings yielding strongest coupling.

Since the transfer electrode spot's cross-section at the edge entering a string of electrodes changes as the transfer electrode spot progresses, the phase versus traverse may be somewhat jerky. Spokes 22 are provided along the circumference of the transfer electrode spot to "blur" the edges of the transfer electrode spot and approximate a gradual onset of density of its edges. This will smooth out the phase versus traverse to some extent.

Dashed lines a–c in FIG. 2A show that connecting the center of each of the transfer electrode spots 21 yields an equi-angular triad. The equi-angular triads appear between any transfer electrode spot 21 and two neighboring transfer electrode spots. The distance between each electrode and its neighboring electrodes is therefore the same.

The transfer electrode spots can be provided on the ball in any suitable polyhedral symmetry. According to a preferred embodiment of the present invention, the ball 20 has a 1" diameter and twelve transfer electrode spots (at least portions of seven of which are showing in FIG. 2A) provided in face-centered dodecahedral symmetry, thereon.

Figure 2B:
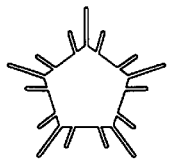

Other shaped transfer electrode spots may also be used, such as the pentagonal star shaped transfer electrode spot depicted in FIG. 2B. Optimally, the pentagonal star shaped transfer electrode spots should be arranged on the surface of the ball with the longest spokes pointing toward one another.

Figure 4:
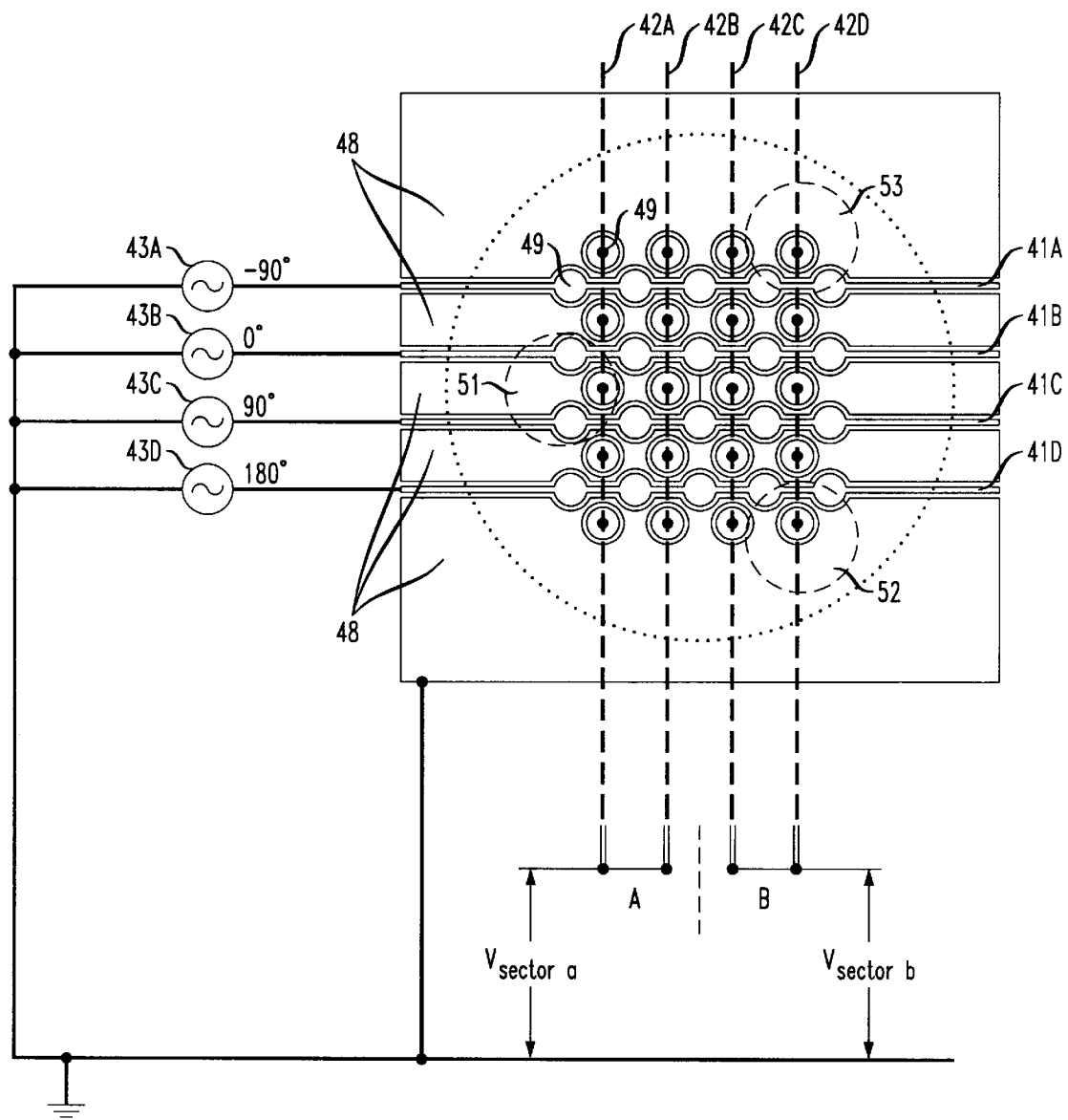
FIG. 4 is a projected plan view of an electrode sensing pattern provided in a socket according to an embodiment of the present invention.

A preferred embodiment of the sensing array pattern provided on the socket will be described in more detail by reference to FIG. 4, which is a plan view of the sensing array. As depicted in FIG. 4, the electrode strings are arranged in two groups of four, with electrode strings 41A–41D being arranged in the horizontal direction and electrode strings 42A–42D being arranged in the vertical direction. Signals to and from the two groups of electrode strings can be multiplexed so that each group of electrode strings can selectively operate alternatively as driving electrodes or as collecting electrodes. This allows the collecting electrodes to be interstitially placed among the driving electrodes without the need for separate collecting and driving electrodes in each the horizontal and vertical directions.

Each string of electrodes consists of a string of interconnected electrode pads 49. (The pads of strings 42A–42D are interconnected on the reverse side of the substrate as indicated by the dashed lines.) According to this embodiment of the present invention, each string of electrodes consists of five electrode pads 49. Although the number of electrode strings or pads can be varied, the total number of pads and strings should be kept to a minimum so that the array of electrodes can be realizable within the confines of existing three-dimensional printed wiring technology. An interelectrode shielding mesh formed by ground plane 48 is provided to help minimize coupling of the drive signals directly onto the collection electrodes.

The sensing array must be sensitive to motion in both the horizontal and vertical directions, so that movement of the cursor in any direction can be provided. As depicted in FIG. 4, horizontal electrode strings 41A–41D are operating as driving electrodes and vertical electrode strings 42A–42D are operating as collecting electrodes. Each electrode string 41A–41D is driven with a signal 43A–43D, respectively, having the same amplitude, but a different phase. As a transfer electrode spot (provided on the ball) moves in the vertical direction, the signal on at least one of the strings of driving electrodes 41A–41D will be coupled through the transfer electrode spot to at least one of the strings of collection electrodes 42A–42D. The phase of the coupled signal will vary depending on the position of the transfer electrode spot with respect to the driving electrodes (i.e., depending on which phase signals are being coupled). The arrangement depicted in FIG. 4 thus has sensitivity to motion in the vertical direction. On the other hand, if the four phase signals 43A–43D are supplied to vertical electrode strings 42A–42D and horizontal electrode strings 41A–41D are used as the collection electrodes, sensitivity to motion in the horizontal direction can be achieved.

Since digital technology will be used to implement the preferred embodiment of the present invention, it is necessary to consider what affects the harmonics in square wave signals used by the drive circuitry may have on the sensing circuitry. As discussed above, although placing the electrodes in a grounded shielding mesh will help minimize coupling of the drive signals directly onto the collection electrodes, there will still be residual coupling. By providing the proper number of signals to the driven electrodes, the affects of the harmonics in the square wave signals can be minimized. For example, square wave signals are rich in odd harmonics. If three phases of square wave signals were used to drive the driving electrodes, the residual coupling would yield a residual signal having a large 3f component, with only the fundamental and some of the harmonics cancelling. Theoretically, if an even number of phases of square wave signals were used, all odd harmonics would cancel.

It should be noted that the internal coupling capacitances of the electrodes within the sensing array will vary depending on the location and size of the electrodes within the array. Accordingly, to maximize cancellation of odd harmonics, the sensing array must be properly balanced. To balance the array, the size of the electrode pads and the spacings between them should be selected so that the net coupling onto the collection electrodes will be zero when the four phase signals are applied to the driving electrodes without a transfer electrode present.

Although various even numbers of phases and phase spacings will do, to minimize space and power requirements, the preferred embodiment includes four phases equally spaced 90° apart. Providing four equally spaced phases totalling 360 degrees ensures phase closure and provides "hand-off" from one transfer electrode spot to another.

It should also be noted that any asymmetry in the square wave signals will yield a number of even harmonics. The even harmonics can be removed using the proper detection circuitry, to be discussed below.

If collection electrodes 42A–42D were all connected together, there is a possibility that dead zones may exist in the array, in which the net signal transferred and collected is zero due to cancellation. For example, when a triad of transfer electrode spots depicted as dotted circles 51–53, enter the position shown in FIG. 4, transfer electrode spot 51 will couple a signal that is 180° out of phase with the signals coupled by transfer electrode spots 52 and 53, thus canceling all transferred signal and leaving a dead zone. This problem can be solved by separating the collecting electrodes into two sectors A and B, as shown.

Sampling each sector to determine which sector has the stronger signal ensures uninterrupted information about the ball's motion. Accordingly, the electronic circuitry necessary for implementing the present invention must be capable of tracking the position of the spots in sectors A and B whenever the signals are available, so that when the signal in one sector wanes, the system will look to the other sector. By considering the sector with the stronger signal, valid information regarding the motion of the ball will always be available.

Figure 5:
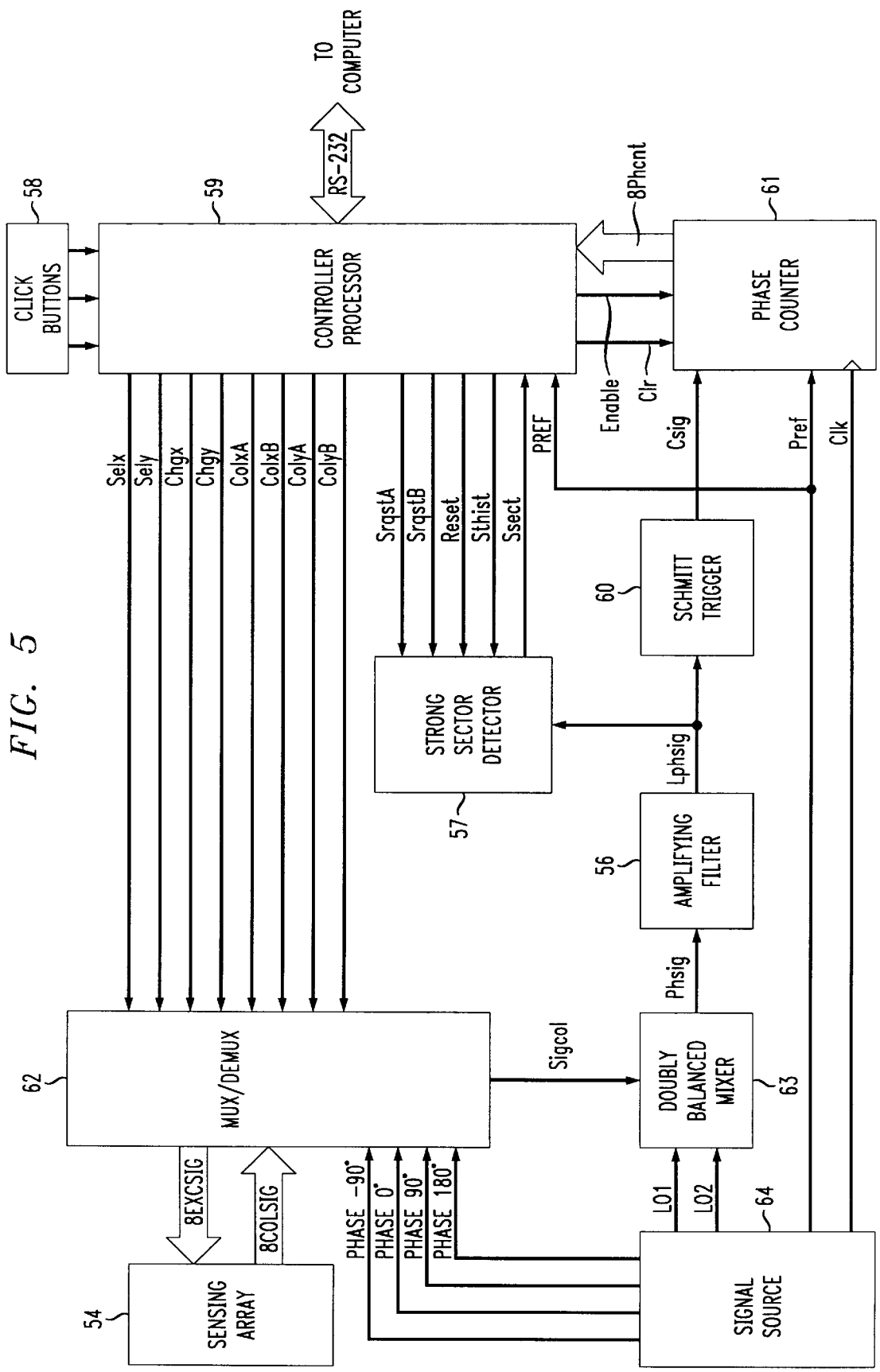
FIG. 5 is a block diagram of electronic circuitry for implementing the electrostatic sensing array according to an embodiment of the present invention.

The electronic circuitry necessary for implementing the track ball sensing scheme according to an embodiment of the present invention will now be described with reference to FIGS. 5–10. FIG. 5 is a block diagram of a preferred embodiment of the electronic circuitry for implementing the electrostatic direct sensing track ball of the present invention.

Signal source 64 generates four equal amplitude, equally spaced phase excitation signals PHASE −90°, PHASE 0°, PHASE 90° and PHASE 180°. The four phase excitation signals are applied to multiplexer/demultiplexer 62. Mux/demux 62, at the proper time, selectively steers the excitation signals from signal source 64 to either the horizontal rows or the vertical rows of strings of electrode pads in sensing array 54. Mux/demux 62, at the proper time, also selectively steers the collected signal from sector A or B of either the horizontal row or the vertical row of strings of electrode pads in sensing array 54 to mixer 63.

Mixer 63 is a doubly balanced mixer that down-converts the high frequency collected signal Sigcol and outputs a lower frequency signal Phsig using local oscillator signals LO1 and LO2. Signal Phsig actually consists of the sum and difference frequencies of the local oscillator frequency and the collected signal frequency. The output of mixer 63 is delivered to amplifying filter 56 which rejects the higher frequency component (e. g., the sum frequency) and outputs the desired low frequency component Lphsig (e.g., the difference frequency) to Schmitt trigger 60 and strong sector detector 57.

Strong sector detector 57 samples the signals from each of the two sectors and outputs an indication Ssect of which sector has the stronger signal. Schmitt trigger 60 uses hysteresis to eliminate false switching and outputs a signal Csig. Phase counter 61 measures the phase difference between phase reference signal Pref and collected signal Csig and provides an eight bit output Phcnt to controller 59 indicating the phase difference.

Click buttons 58 perform the same functions typical of the click buttons on a track ball. Controller 59 intermittently polls click buttons 58 to determine if one has been selected.

Controller processor 59 functions as a system controller, data processor and a computer interface, performing a series of sequences, reading in measurement data and calculating cursor command information.

Embodiments of the circuitry necessary for implementing several of the blocks in FIG. 5 will now be described in more detail.

Mux/demux 62 selectively steers the four phase excitation signals to the appropriate strings of driving electrode pads and also steers the collected signals from the appropriate strings of collection electrode pads to mixer 63. A detailed description of mux/demux 62 will be provided by reference to FIG. 6.

As described above and below for clarity of presentation, sensing array 54 is shown with 16 input/output lines. However, it should be noted that since the principle of the present invention is based on voltage potentials with negligible currents, it is possible to implement the present invention with only 8 lines interconnected between Mux/demux 62 and sensing array 54. For example, for each of the four strings of horizontal electrode pads, the same node could be connected to the multiplexer circuitry and the demultiplexer circuitry. The same can be done for the four strings of vertical electrode pads.

Figure 6:
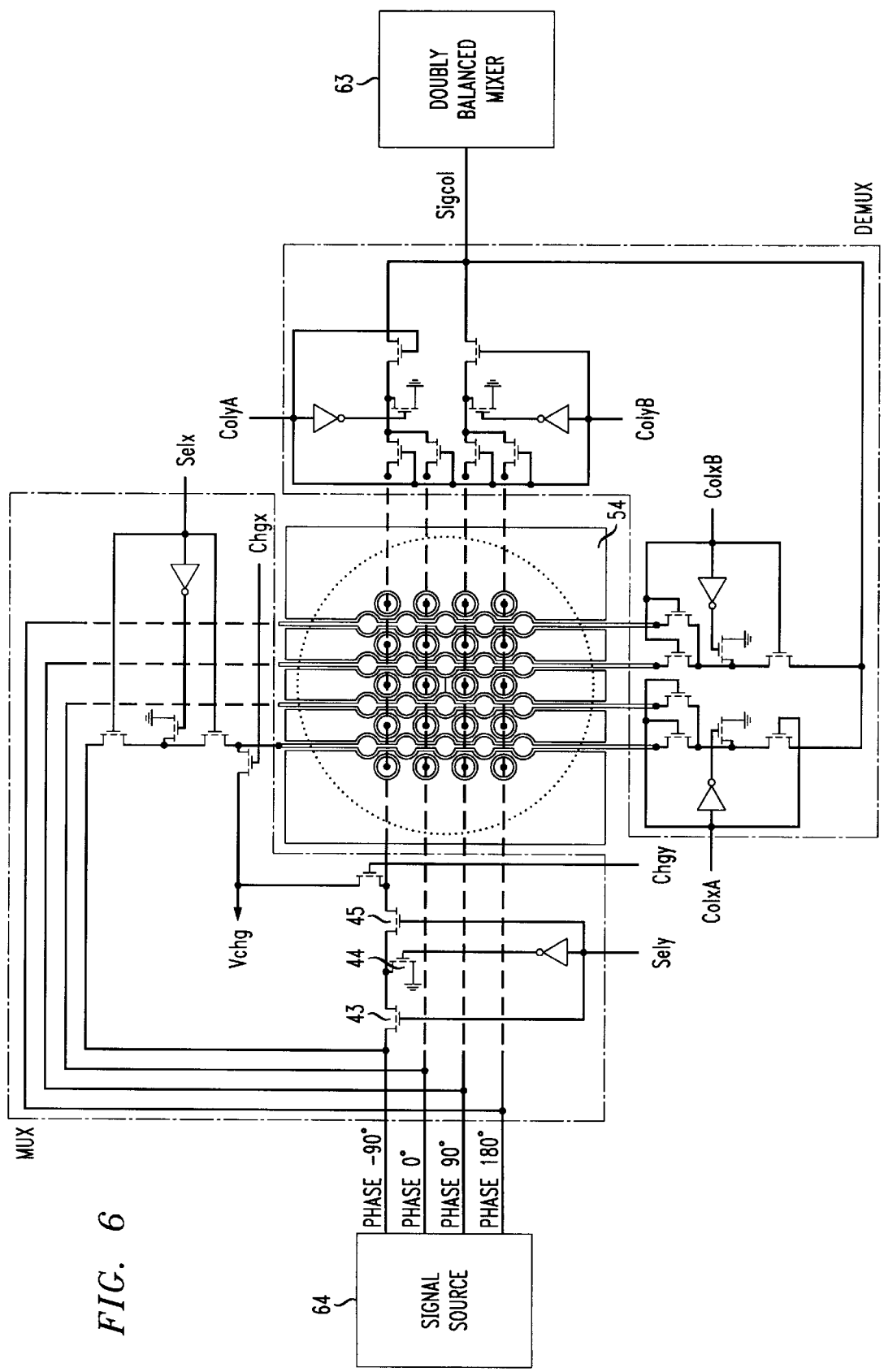
FIG. 6 is a schematic diagram of a multiplexer/demultiplexer circuit according to an embodiment of the present invention.

The signals to and from the sensing array input/output lines are selectively coupled through a set of tee switches to signal source 64 or mixer 63 depending on the direction of sensitivity (i.e., horizontal or vertical). For clarity purposes, only one set of tee switches are shown for each the horizontal and vertical strings of electrode pads. However, it should be noted that each string of electrode pads includes a similar set of tee switches. As shown in FIG. 6, mux/demux 62 consists essentially of a multiplexer circuit MUX and a demultiplexer circuit DEMUX.

Controller processor 59 controls the direction of sensitivity by selecting or deselecting the groups of tee switches. For example, when a measurement for the vertical direction of sensitivity is to be made, controller 59 sets the Sely signal which selects switches 43 and 45, and opens switch 44, to steer the four phase excitation signals from the signal source 64 to the horizontal strings of electrode pads of sensing array 54. The controller also sets signal ColxA, which steers the collected signal from sector A of the vertical strings of electrode pads to mixer 63. After the column x, sector A measurement is made, controller 59 sets signal ColxB, to steer the collected signal from sector B of the vertical strings of electrode pads to mixer 63. After the column x, sector B measurement is made, the measurements are made in similar fashion for the horizontal direction of sensitivity.

The input to mixer 63 is sensitive to signals having very small amplitudes. However, after the strings of electrode pads have been driven with the square wave excitation signals, the electrodes will capacitively hold a relatively large voltage. If these charged electrodes where immediately switched to collection electrodes and input to mixer 63, the capacitive charge would overwhelm and possibly damage the input to mixer 63. Accordingly, mux/demux 62 also includes precharging circuitry for precharging the collection electrodes to an appropriate voltage prior to signal collection. Prior to switching from driving electrodes to collection electrodes, controller 59 issues a Chgx or Chgy signal so that the collection electrode strings can quickly be brought down to a suitable voltage Vchg, thus preventing damage to the input to mixer 63.

Because of the small coupling capacitances of the sensing array, a high frequency is desirable for the four phase excitation signals. However a lower frequency signal allows gain to be much more easily attained and also eases processing and aids in power conservation. Accordingly, mixer 63, in combination with amplifying low pass filter 56 is used for down-converting the collected signal Sigcol to a more convenient lower frequency signal Lphsig. Mixer 63 can consist of a Gilbert four quadrant multiplier, for example.

As discussed above, any asymmetry in the excitation signal waveforms causes even harmonics which will not be cancelled even by proper balancing of the sensing array. Therefore, a complementary pair of local oscillator signals, LO1 and LO2 are used to drive doubly balanced mixer 63 to cancel any residual even harmonics. However, to effectively cancel the residual even harmonics in the mixer, the two local oscillator signals LO1 and LO2 must contain the fundamental in differential mode and all even harmonics in common mode. Simply inverting the signal will not achieve this but will, instead, invert all components of the waveform. Therefore, the complementary waveform must be generated by time shifting the original signal 180°. Generating each of the two local oscillator signals in similar parallel or symmetrically arranged paths will achieve this, imparting a 180° phase shift to the fundamental while retaining all even harmonics in phase. The even harmonics will then appear to mixer 63 as common mode, thus rendering it insensitive to them.

The output of mixer 63 is input to amplifying filter 56 which consists of a low pass filter and an amplifier. Amplifying filter 56 passes and amplifies the low frequency component of the signal Phsig output from mixer 63 (e.g., the difference frequency). The signal Lphsig output by amplifying filter 56 carries the desired phase information. The output of amplifying filter 56 is then input to Schmitt trigger 60 which uses hysterisis to prevent false switching of the signal. The output of amplifying filter 56 is also input to strong sector detector 57.

As discussed above, the collection electrodes in the sensing array are divided into two sectors to prevent "dead zones". Accordingly, the system must be capable of determining which of the two sectors in each the horizontal and vertical directions contains the stronger signal. By design of the electrode patterns provided on the ball and socket, there will always be a signal from at least one sector of the array. If a signal is received from only one of the sectors, that signal is considered valid and is used to determine phase differential. However, if both sectors contain signals, to extract valid data from the signals, the system must choose the sector with the stronger signal. Strong sector detector 57 is used for performing this function.

Figure 7:
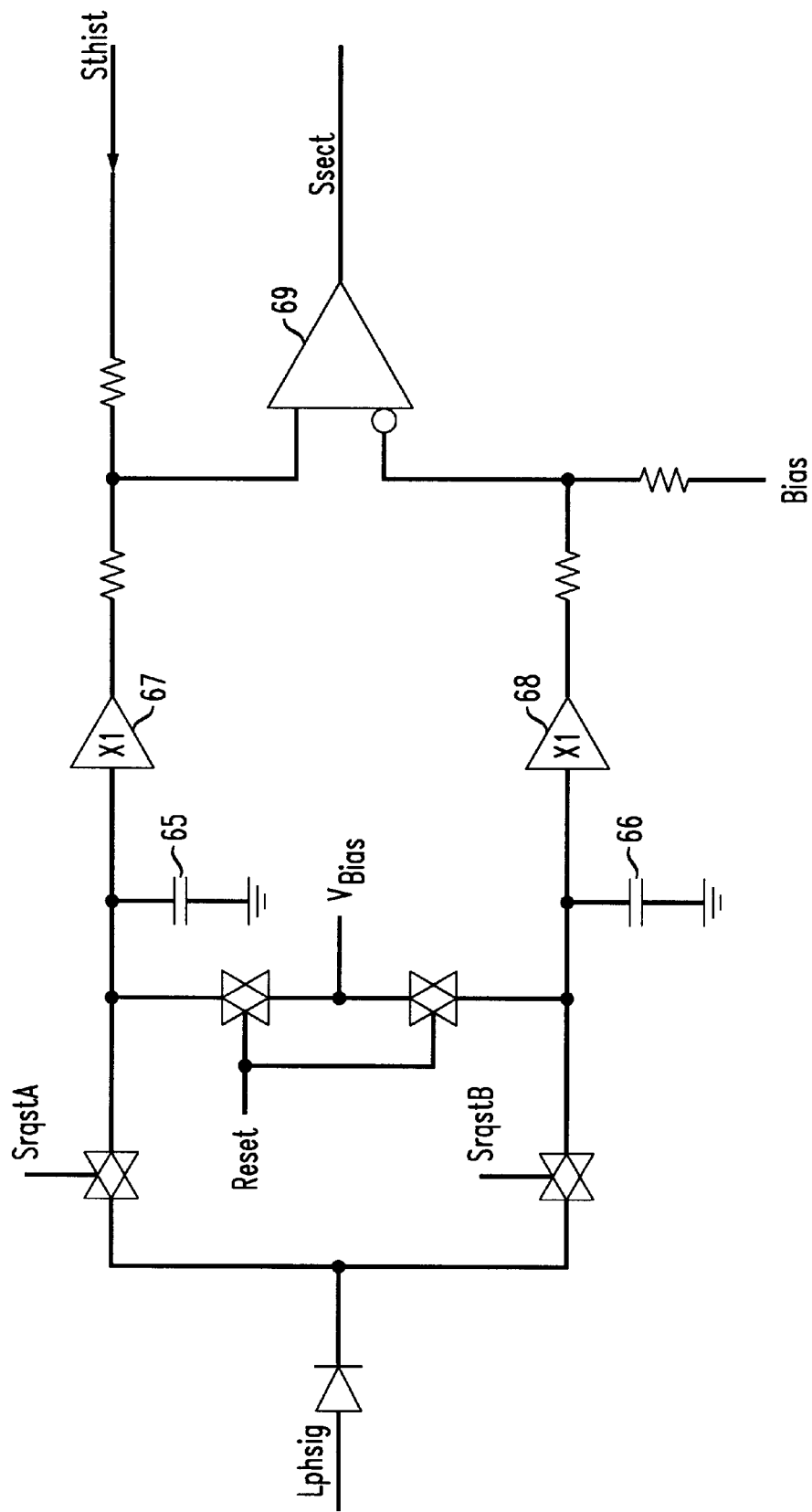
FIG. 7 is a strong sector peak detecting track and hold circuit according to an embodiment of the present invention.

According to an embodiment of the present invention as shown in FIG. 7, strong sector detector 57 can consist of two peak detecting, track-and-hold sampler circuits followed by a differential comparator. The first sampler circuit samples the peak signal from sector A, and stores the sample in capacitor 65. The second sampler circuit samples the peak signal from sector B, and stores that sample in capacitor 66. The two stored signals are then compared by differential comparator 69. The output of the differential comparator Ssect is then read and stored by controller 59. The signal Ssect output from strong sector detector 57 indicates which of the two sectors is strongest. Strong sector detector 57 alternately makes this comparison of each of the two sectors for both the horizontal and vertical directions of sensitivity.

Controller 59 returns a signal Sthist to strong sector detector 57 as hysteresis, to prevent dithering when the signal strengths from the two sectors are nearly equal. Signal Sthist consists of information indicating which of the two sectors contained the stronger signal during the previous measurement. Buffers 67 and 68 prevent capacitors 65 and 66 from discharging too quickly.

The phase of the collected signal from the sensing array represents the relative position within the sensing array of a transfer electrode spot on the ball. To determine the phase of the collected signal, the signal Csig output from Schmitt trigger 60 and containing the phase information, is compared with the phase of stationary reference signal Pref, which has the same frequency as signal Csig. The phase difference between the two signals can be determined and digitized by counting the number of higher frequency clock pulses Clk for the interval between zero crossings of the reference signal Pref and the collected signal Csig.

Phase counter 61 performs the function of counting the time interval between the respective zero crossings and sends an 8-bit value Phcnt to controller 59 indicating the phase difference. Phase counter 61 can include, for example, digital logic circuitry forming a start-stop flip-flop such as that disclosed in U.S. Pat. No. 4,607,173 to Knoedl, Jr., incorporated herein by reference, that initially enables an eight bit counter to start counting high frequency clock pulses (Clk) upon a rising edge of phase reference signal Pref and disables and stops the eight bit counter from counting upon a subsequent rising edge of the signal Csig. The start-stop flip-flop arrangement also allows controller 59 to enable and disable the counter from restarting, using signal Enable. The 8-bit count Phcnt from phase counter 61, a measure of the difference in time between the respective rising edges, is read by controller 59 which interprets the count as a measure of the difference in phase between the two signals Pref and Csig.

By comparing the value of the read 8-bit count with the value of the 8-bit count from the previous measurement for the same sector, processor 59 can determine relative movement of the track ball. The processor can then format an appropriate command for moving the cursor on the video display screen in the proper direction.

Signal source 64 generates a set of signals to drive the sensing array, including four equal amplitude, equally spaced phase signals PHASE −90°, PHASE 0°, PHASE 90° and PHASE 180°, representing one revolution of electrical phase. Signal source 64 also provides detector synchronizing signals LO1 and LO2 for doubly balanced mixer 63, phase reference signal Pref and high frequency clock signal Clk for phase counter 61. Signal source 64 can be implemented in any number of ways. However, the signals that must be generated are constrained by certain limitations. For example, the frequency of signals LO1 and LO2 must equal the frequency of the four phase signals plus or minus the frequency of the signal Lphsig output from amplifying filter 56. In addition, the frequency of the collected signal Csig, must be the same as the frequency of the phase reference signal Pref and, to ensure closure of the phase measurement, the modulus of the phase counter 61 must equal the ratio of the frequency of clock signal Clk divided by the frequency of the phase reference signal Pref. In the preferred embodiment this modulus equals $2^n$, where n equals the number of stages of phase counter 61. According to this embodiment of the present invention, n=8.

A system requirement is to transmit 40 vector motion measurements per second with a resolution of about one part in 1024. There are four sectors (2 horizontal and 2 vertical) in which to make scaler, differential position measurements. Allowing for settling time between measurements, this requires about ten cycles of the signal Csig. Accordingly, the frequency of signal Csig must approximately equal at least 400 Hz. As noted above, the phase reference signal Pref, which is used to measure the phase of the collected signal Csig, must have the same frequency as Csig. Therefore, the frequency of Pref is also 400 Hz. The phase resolution needed to achieve a transfer electrode spot position resolution of one part in 1024 per revolution of the ball, need be about one part in 200. An 8-stage counter used for phase counter 61 can count to $2^8=256$, which is sufficient and convenient. Since the 8-stage counter must be able to count to 256 at least 400 times per second, the frequency of the counting clock Clk must be about 100 KHz, which is also a convenient frequency for each of the four phase excitation signals. The following is a description of several ways in which signal source 64 can be implemented.

Figure 8:
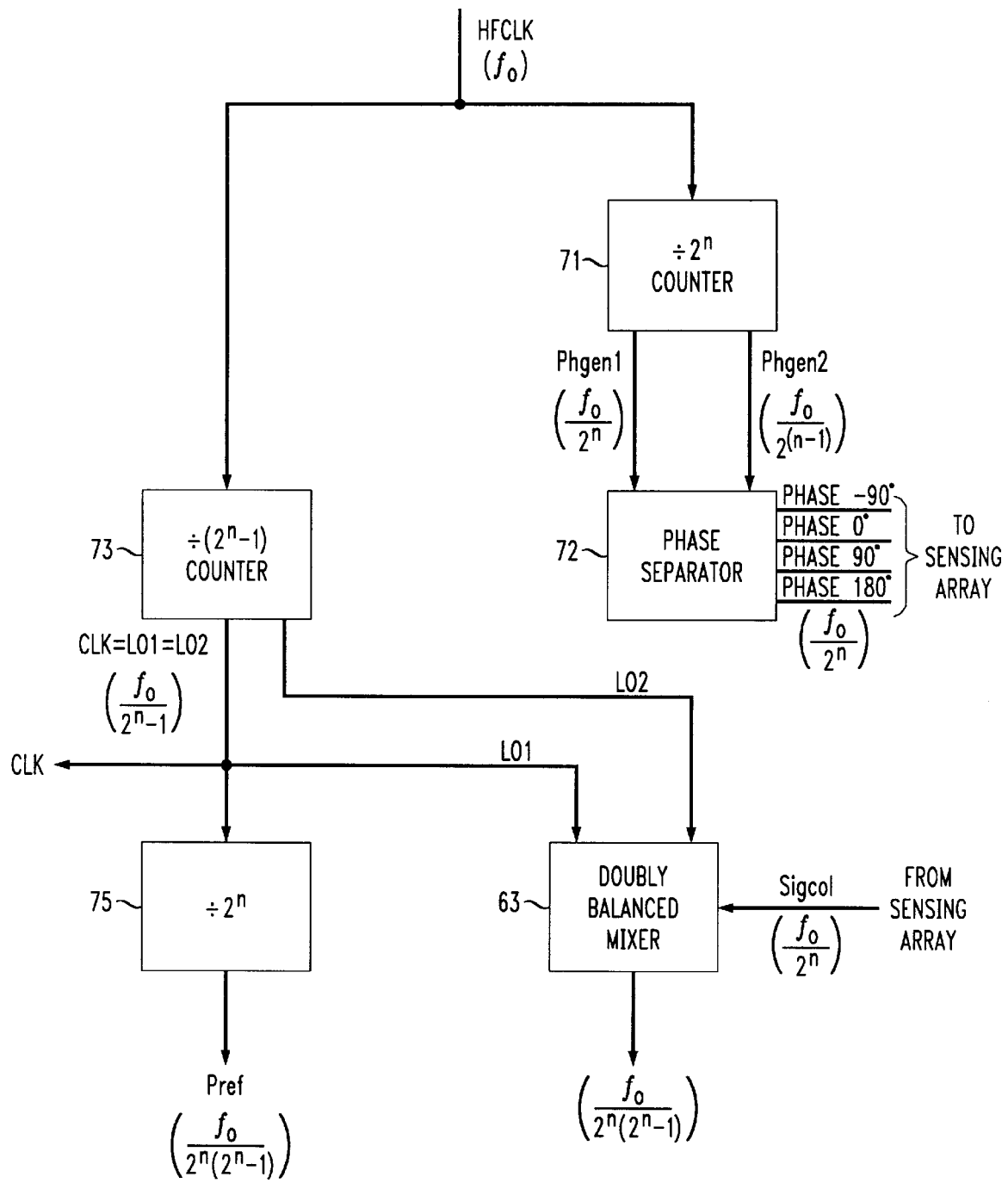
FIG. 8 is a block diagram of a fast clock state machine signal generator according to an embodiment of the present invention.

A first embodiment for generating the required signals consists of a fast clock state machine signal generator as shown in FIG. 8. High frequency source clock Hfclk having a frequency $f_o$, is divided by $2^n$ by divider 71 to yield a pair of signals Phgen1 and Phgen2 having frequencies $f_o/2^n$ and $f_o/2^{n-1}$, respectively. Divider 71 can be, for example, a free running n-stage, binary counter, with n being the number of bits output by phase counter 61. The four phase signals are then derived from the Phgen signals by phase separator 72. The four phase signals required for exciting the sensing array may be derived, for example, either through combinational logic or by counting in reflected Gray code. High frequency source clock Hfclk is also divided by $2^n-1$ by divider 73 to yield a complementary pair of signals LO1 and LO2 having a frequency $f_o/(2^n-1)$. These signals are input to mixer 63 which outputs a signal including sum and difference frequencies. The desired difference frequency signal output from mixer 63 will have a frequency $f_o/2^n(2^n-1)$. The phase reference signal Pref can be derived by further dividing the LO1 signal by $2^n$ again to yield a signal having a frequency $f_o/2^n(2^n-1)$ which is the same frequency as collected signal Csig. Clock signal Clk preferably has the same frequency as the local oscillator signals and can therefore be provided, as shown.

Figure 9:
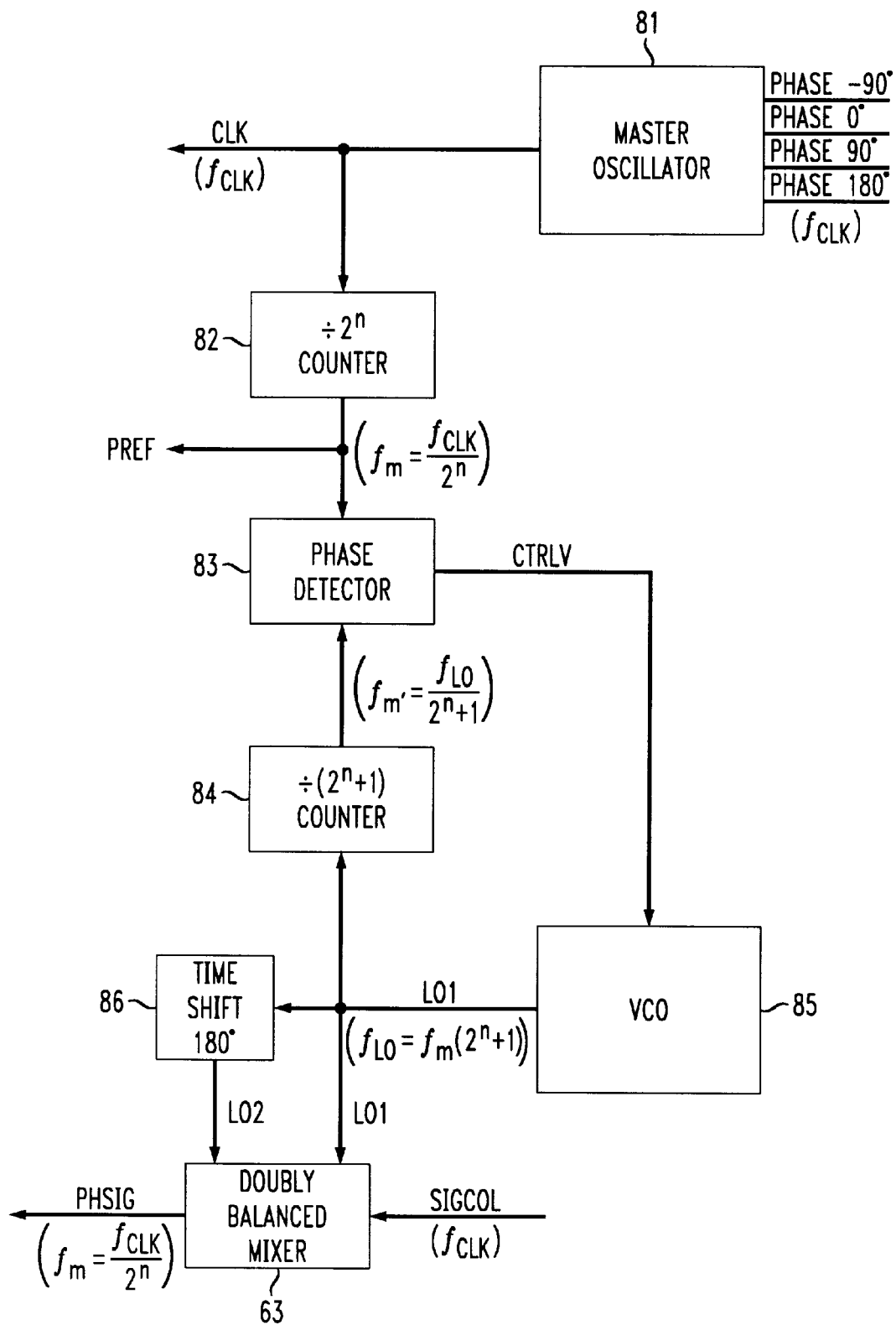
FIG. 9 is a block diagram of a phase locked loop frequency translator according to an embodiment of the present invention.
Figure 10A:
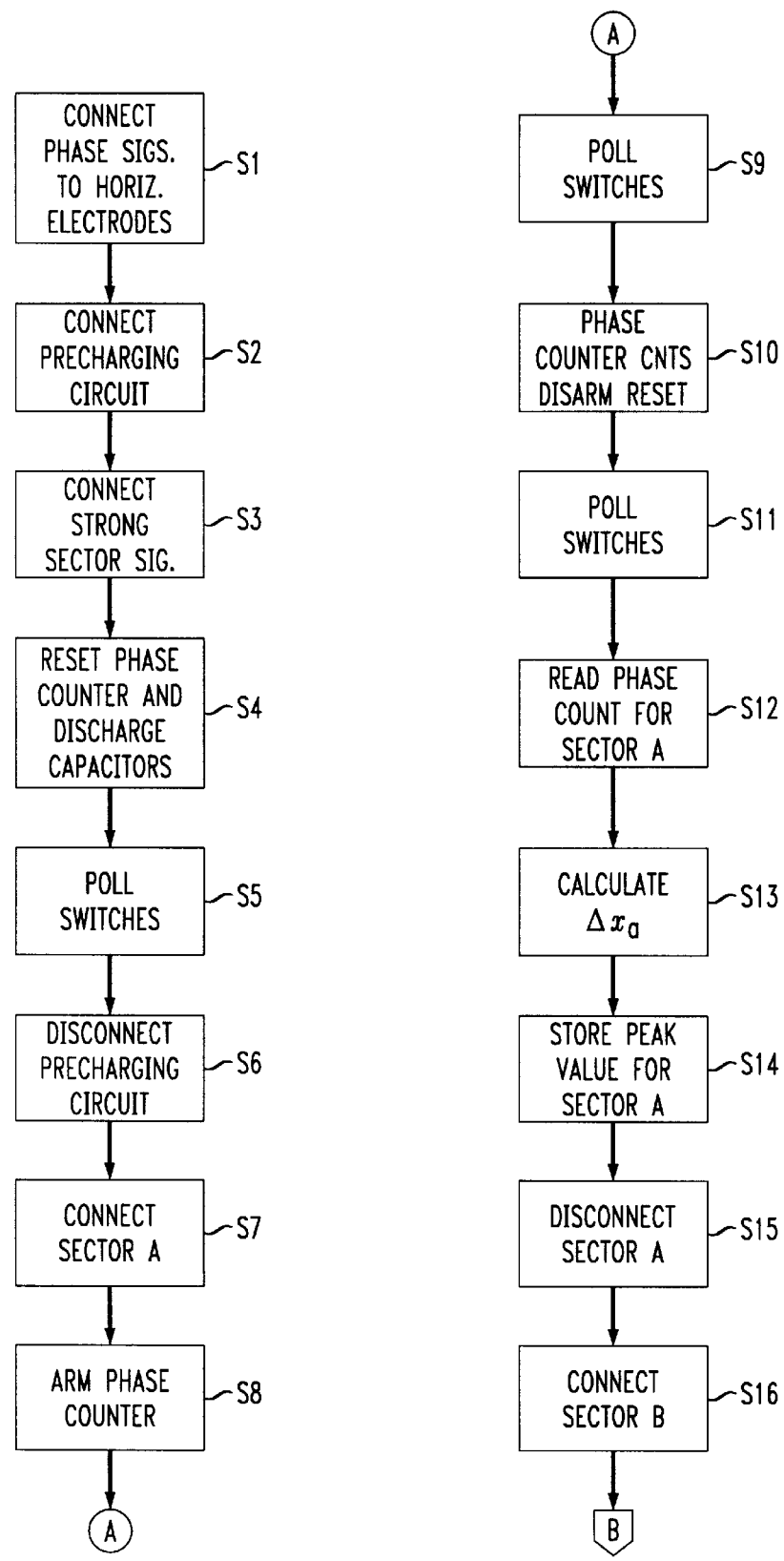
FIGS. 10A–10B are flow charts of a control procedure according to an embodiment of the present invention.
Figure 10B:
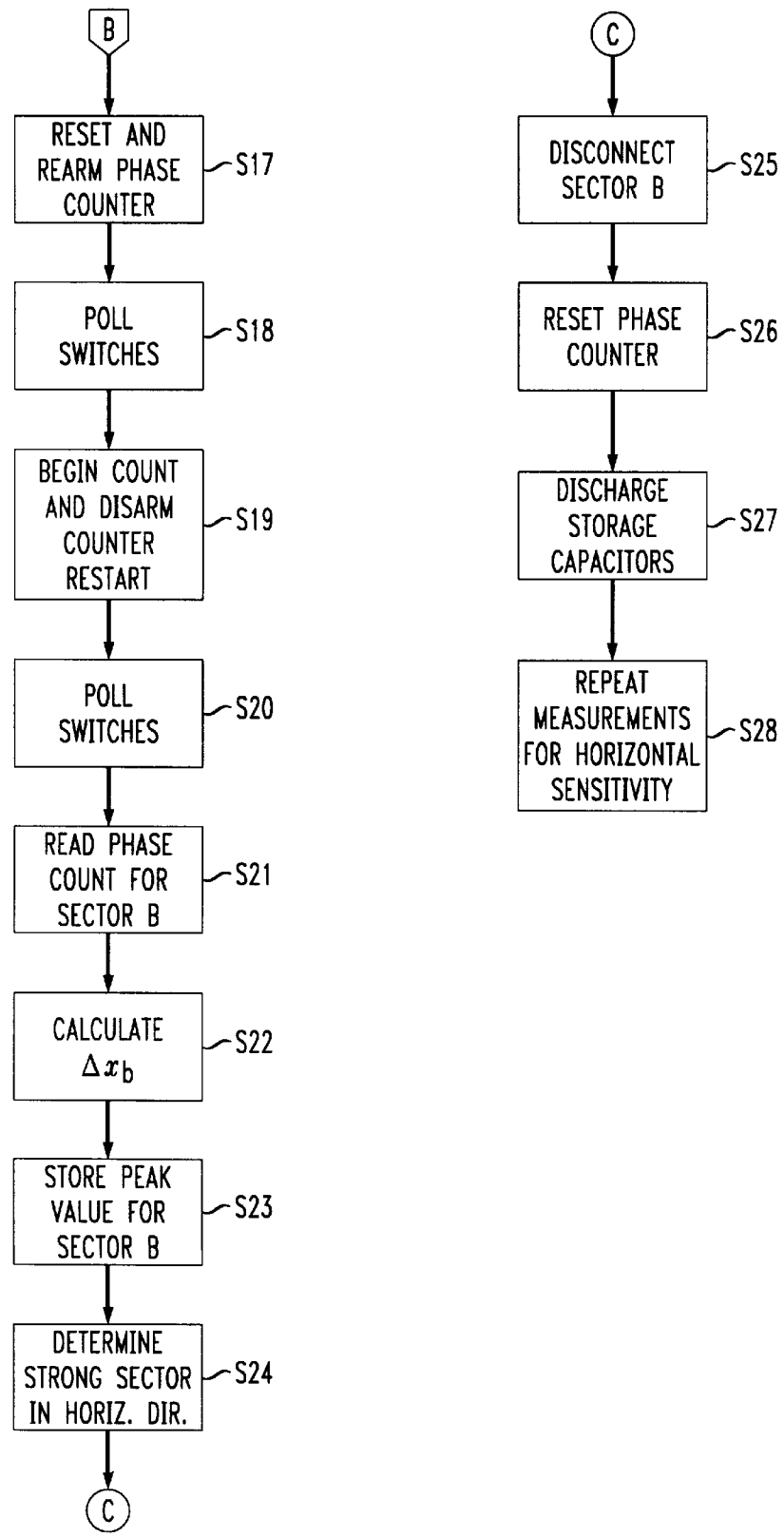

Another method for deriving the required clock signals is depicted in FIG. 9, and consists of a phase locked loop frequency translator.

Master oscillator 81 generates and outputs the four phase signals PHASE −90°, PHASE 0°, PHASE 90° and PHASE 180°, as well as clock signal Clk, all having a frequency $f_{clk}$. Master oscillator 81 can be implemented in many different ways. For example, the signals can be generated using a quadrature oscillator or by digital state machines. Clock signal Clk is input to counter 82 which divides the frequency of signal Clk by $2^n$ to produce signal $f_m$. Signal $f_m$ will have a frequency $f_{clk}/2^n$. Signal $f_m$ can be used for phase reference signal Pref. Voltage controlled oscillator 85 generates and outputs the local oscillator signal LO1. Local oscillator signal LO1 is input to counter 84 which divides the frequency of signal LO1 by $2^n+1$ to produce a second signal $f_m'$. Signal $f_m'$ will have a frequency $f_{LO}/2^n+1$.

Voltage controlled oscillator 85, counter 84 and phase detector 83 form a phase locked loop. Signals $f_m$ and $f_m'$ are connected to phase detector 83 which, through phase locked loop action, forces $f_m'$ to equal $f_m$. Hence the LO1 signal will have a frequency $f_{LO}=f_m(2^n+1)$.

It can be shown that $f_{LO}=f_m(2^n+1)=f_m2^n+f_m$. Since $f_{clk}=f_m2^n$, $f_{LO}=f_{clk}+f_m$ which is the desired frequency relationship for the local oscillator and excitation frequencies. The output of mixer 63 is then the sum and difference of input frequencies $f_{clk}$ and $f_{LO}$. That is, signal Phsig will have a sum frequency component $2f_{clk}+f_m$ and a difference frequency component $f_m$.

Other methods of generating the required signals include the use of a single sideband frequency translator such as that suggested by Donald E. Norgaard, "The Phase-Shift Method of Single-Sideband Signal Generation," Proceedings of the IRE, December 1956, pp 1718–1735, as well the discrete phase modulation technique system employed by Mitutoyo Corp. in its digital caliper devices.

Controller 59 controls the entire measurement system. Controller 59 generates measurement control signals, reads in measurement data, calculates cursor command information and transfers the information to the connected host computer, typically a P.C., over an RS-232 bus interface. The control sequence performed by controller 59 will now be described with reference to the flow chart depicted in FIGS. 10A–10B, the block diagram depicted in FIG. 5 and the circuitry depicted in FIGS. 6 and 7.

In step S1, the controller issues a signal Sely to enable the four phase excitation signals PHASE −90°, PHASE 0°, PHASE 90° and PHASE 180° to be connected to the horizontal strings of electrode pads in the sensing array (See FIG. 6).

In step S2, the controller issues a precharge signal Chgx to precharge the vertical strings of electrode pads in the sensing array to the voltage Vchg.

In step S3, the strong sector history signal Sthist is sent by controller 59 to strong sector detector 57 as hysteresis to prevent dithering.

In step S4, phase counter 61 is reset to zero by issuance of a clear signal Clr and the track and hold capacitors 65 and 66 in strong sector detector 57 are discharged by issuance of a reset signal Reset.

In step S5, the "click button" switches 58 are polled to determine if one has been selected. One iteration of a switch state debounce routine is executed and the information is noted for later transmission.

In step S6, the Chgx signal is removed so that the precharging circuit is effectively removed from the sensing array.

In step S7, controller 59 issues a signal ColxA to connect sector A of the vertical strings of electrode pads of the sensing array to the input of mixer 63.

In step S8, the controller issues an Enable signal that arms phase counter 61 to enable the counter to begin counting.

In step S9, the "click button" switches are again polled.

In step S10, after enabled phase counter 61 receives the next rising edge of phase reference signal Pref, it begins counting and controller 59 disarms the phase counter from restarting by removing the Enable signal. Removing the Enable signal avoids any false triggering or restarting of the phase counter.

In step S11, the "click button" switches are once again polled.

In step S12, the controller reads the 8-bit phase count Phcnt for sector A from phase counter 61.

In step S13, controller 59 compares the read phase count with the phase count for sector A from the previous measurement and calculates ΔXa which indicates the change in phase in sector A since the last measurement.

In step S14, the peak value of the signal Lphsig output from amplifying filter 56 is stored into A sector storage capacitor 65 of the track and hold circuit in strong sector detector 57, by issuance of a sample request signal SrqstA.

In step S15, ColxA signal is removed so that the A sector is disconnected.

In step S16, ColxB signal is issued so that sector B of the vertical strings of electrode pads of the array is connected to the input of mixer 63.

In step S 17, clear signal Clr is issued to reset phase counter 61 to zero and the Enable signal is issued to rearm the phase counter 61 to enable the counter to respond to a subsequent command to begin counting.

In step S18, the "click button" switches are polled.

In step S19, after enabled phase counter 61 receives the next rising edge of phase reference signal Pref it begins counting, and controller 59 disarms phase counter 61 from restarting by removing the Enable signal.

In step S20, controller 59 polls the "click button" switches.

In step S21, the 8-bit phase count Phcnt for the B sector is read in by controller 59.

In step S22, controller 59 compares the phase count for sector B with the phase count for that sector from the previous measurement and calculates ΔXb indicating the change in phase in that sector since the last measurement.

In step S23, the peak value of the signal Lphsig output from amplifying filter 56 is stored into B sector storage capacitor 66 of the track and hold circuit in strong sector detector 57 by issuance of a sample request signal SrqstB.

In step 24, controller 59 reads the signal Ssect from strong sector detector 57. Ssect indicates which sector (A or B) of the vertical strings of electrode pads has the stronger signal.

In step S25, the B sector is disconnected by removal of the ColxB signal.

In step S26, clear signal Clr is issued to reset phase counter 61 to zero. In step S27, the A sector and B sector storage capacitors 65 and 66 in strong sector detector 57 are discharged by issuance of reset signal Reset. The measurement process for sensitivity in the vertical direction is now complete.

The process is then repeated for sensitivity in the horizontal direction by issuance of the proper signals for enabling the four phase excitation signals onto the vertical strings of electrode pads, precharging the horizontal strings of electrode pads and reading the collected signals from the A and B sectors of the horizontal strings of electrode pads.

After the measurement process for sensitivity in the horizontal direction is complete, controller 59 determines valid sectors for both the horizontal and vertical directions based on the strong sector signals Ssect read by the controller. The controller then compares the information read from the valid sectors, with previous information from the corresponding sectors, and determines relative motion of the track ball in the horizontal and vertical directions (i.e., ΔX and ΔY). Cursor command information and "click button" status information are then formatted by the controller based on this information and prepared for transmission.

Of course, it will be appreciated that the present invention is useful not only for a track ball unit, but would also be useful for a mouse, joy stick or any other device that must provide information indicating relative motion in a two-dimensional plane.

Figure 11:
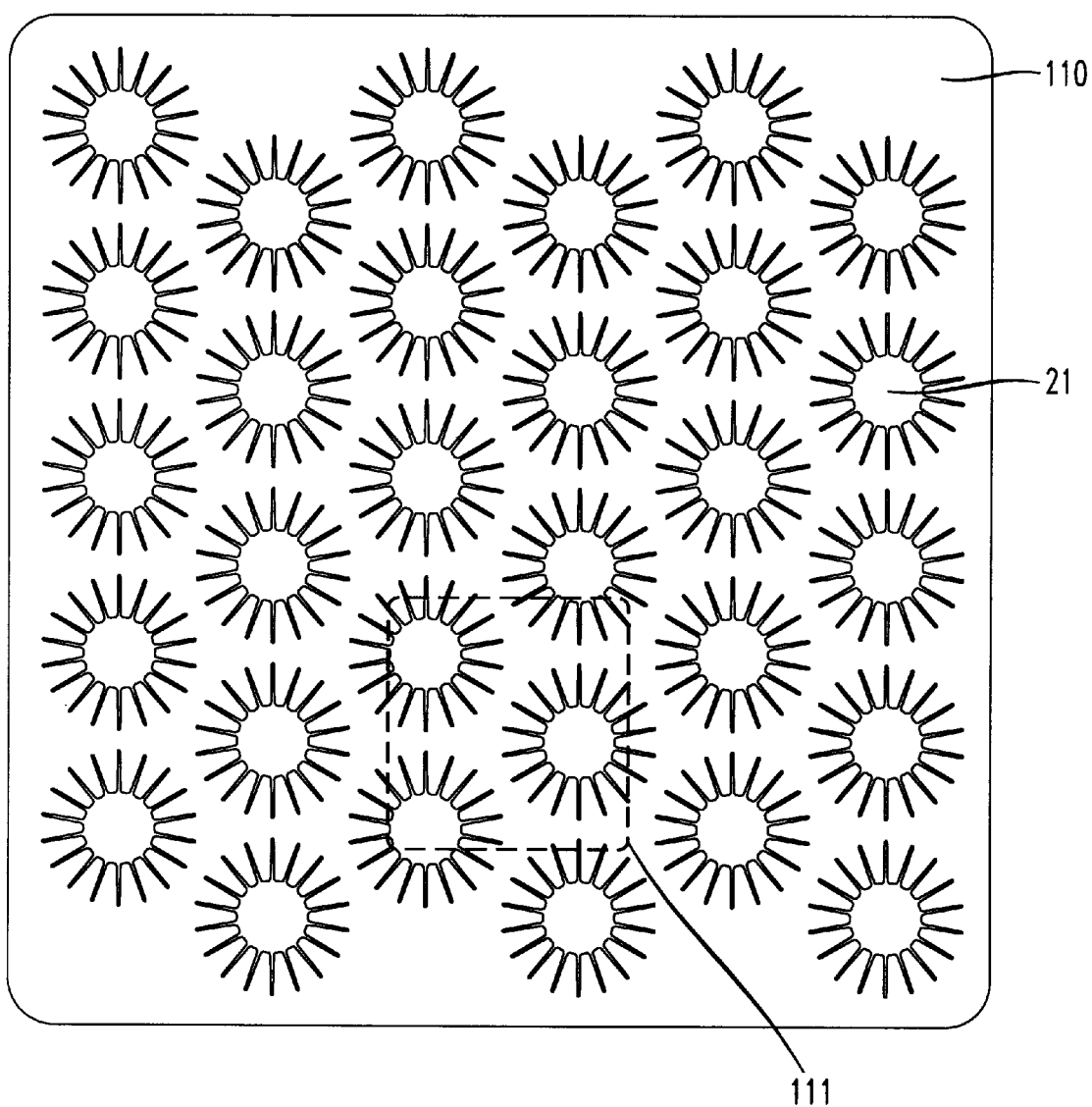
FIG. 11 is a plan view of a direct-sensing mouse and pad arrangement according to an embodiment of the present invention.

For example, a conventional style mouse with no moving parts except for the mouse body itself can be realized by affixing a planar version of the sensing array of FIG. 6 to the under side of the mouse body 111 as indicated in FIG. 11, and sliding it over a stationary pad 110 which bears transfer electrode spots 21 similar to those on the ball of FIG. 2a and which are arranged in a hexagonally packed array, as shown in FIG. 11. In the alternative, the transfer electrodes could be placed on the mouse body 111 and the sensing array could be placed on the stationary pad 110.

Similarly, while we have described a particularly simple implementation using a symmetric array of electrodes on the ball, and a minimal array of sensors in the socket, more complex arrangements will work as well. For example, the ball could be arbitrarily patterned with electrodes in the shape of the earth's continents. If the sensor electrodes were sufficiently dense and numerous to constitute a capacitive "camera", then the motion of the ball can be calculated by comparing the relative motion of two consecutive "snapshots" of the ball's electrode pattern.

In addition, the present invention can be used as a finger mouse in which the sensing array is placed on a stationary pad and a user's finger, which acts as a transfer electrode, is moved over the array and transfers the signals from the driving electrodes to the collecting electrodes.

It will be appreciated that the foregoing description and drawings are only intended to be illustrative of the present invention. Variations, changes, substitutions and modifications of the present invention may occur to those skilled in the art without departing from the spirit and scope of the present invention. Accordingly, it is intended that the present invention be limited only by the scope of the appended claims.

What is claimed is:

1. A track ball device, comprising:
    a ball having a pattern of first electrodes; and
    socket into which the ball sits, the socket having a first group of electrodes intersecting a second group of electrodes;
    wherein a relationship between the pattern of first electrodes and the first and second group of electrodes is such as to enable direction of ball rotation to be sensed by electrostatic transfer of signals between ones of the first and second group of electrodes via at least one of the pattern of first electrodes when the ball rotates in the socket.

2. A track ball device according to claim 1, wherein the second electrodes comprise a plurality of strings of electrodes.

3. A track ball device according to claim 2, wherein each string of electrodes comprises a plurality of interconnected electrode pads.

4. A track ball device according to claim 1, wherein the first electrodes comprise a plurality of circular electrodes.

5. A track ball device according to claim 4, wherein a density of edges of the circular electrodes are graded.

6. A track ball device according to claim 1, wherein the first electrodes comprise a plurality of pentagonal star shaped electrodes.

7. A track ball device according to claim 6, wherein a density of edges of the pentagonal star shaped electrodes are graded.

8. A track ball device according to claim 2, wherein the plurality of strings of electrodes comprise two interstitially arranged groups of electrodes.

9. A track ball device according to claim 8, wherein each group of electrodes is selectively operable alternatively as driving electrodes and as collecting electrodes.

10. A track ball device according to claim 9, wherein at least two strings of electrodes of a group of electrodes operating as collecting electrodes are interconnected to form a sector, and wherein at least two sectors are provided.

11. A track ball device according to claim 10, further comprising a signal generator for generating a plurality of different phase signals, each of the plurality of different phase signals being applied to a respective one of the strings of electrodes operating as driving electrodes.

12. A track ball device according to claim 11, wherein the different phase signals generated by the signal generator comprise an even number of equally spaced phase signals.

13. A track ball device according to claim 1, wherein the patterns of the first and second electrodes are arranged so that the second electrodes can sense change in the position of the first electrodes as the ball is rotated, such combination of first and second electrodes being sufficient to uniquely determine the orientation of the ball.

14. A track ball device comprising:
    a ball having a pattern of first electrodes;
    a socket into which the ball rotatable sits, the socket having a pattern of second electrodes comprising a plurality of strings of electrodes including two interstitially arranged groups of electrodes;
    each group of electrodes being selectively operable alternatively as driving electrodes and as collecting electrodes;
    wherein at least two strings of electrodes of a group of electrodes operating as collecting electrodes are interconnected to form a sector, and wherein at least two sectors are provided;
    a signal generator for generating a plurality of different phase signals, each of the plurality of different phase signals being applied to a respective one of the strings of electrodes operating as driving electrodes, wherein the different phase signals generated by the signal generator comprise an even number of equally spaced phase signals,
    wherein a product of the number of equally spaced phase signals and a phase difference between the equally spaced phase signals is 360°, to provide phase closure.

15. A track ball device according to claim 14, further comprising collecting means for collecting a phase information signal from each sector of the group of electrodes operating as collecting electrodes, the phase information signal being coupled from the electrodes operating as driving electrodes to the electrodes operating as collecting electrodes by the conductive elements provided on the ball.

16. A track ball device according to claim 15, wherein the collecting means comprises a finite modulus counter for measuring a phase difference between a phase reference signal and the collected phase information signal, wherein a count modulus of the counter equals a ratio of a frequency of a clock being counted and a frequency of the phase reference signal which gates the counter, the phase closure and the specific count modulus providing range extension beyond that of a finite sensing array.

17. A track ball device according to claim 16, wherein the count modulus is an integral power of two.

18. A track ball device according to claim 15, wherein the collecting means further comprises a mixer for frequency down-converting the collected phase information signal using first and second local oscillator signals, the second local oscillator signal being time shifted 180° from the first local oscillator signal, the mixer effectively suppressing even harmonics.

19. A track ball device according to claim 18 wherein the mixer comprises a doubly balanced mixer.

20. A track ball device according to claim 18, wherein the mixer comprises a four quadrant Gilbert multiplier.

21. A sensing array system having two axes of sensitivity for determining relative motion in each of the two axes, the system comprising:
   a first substrate having a plurality of interstitially arranged electrodes provided thereon, including a first group of electrodes intersecting a second group of electrodes; and
   a second substrate having at least a first transfer electrode and a second transfer electrode provided thereon,
   wherein the first and second substrates are configured to move relative to each other for the first transfer electrode to engage at least one of the plurality of interstitially arranged electrodes and for the second transfer electrode to engage at least another of the plurality of interstitially arranged electrodes.

22. A sensing array system according to claim 21, wherein the plurality of interstitially arranged electrodes selectively operate alternatively as driving electrodes for providing a plurality of signals to the sensing array and as collecting electrodes for collecting signals capacitively transferred from the driving electrodes by the at least one transfer electrode.

23. A sensing array system according to claim 21, wherein interstitially arranged electrodes are provided in a grounded shielding mesh.

24. A sensing array system according to claim 21, wherein the first group of electrodes are oriented in a first direction and the second group of electrodes are oriented in a second direction generally perpendicular to the first direction.

25. A sensing array system according to claim 21, wherein each group of electrodes is further divided into two sectors.

26. A sensing array system according to claim 21, wherein the at least one transfer electrode has a circular spot shape.

27. A sensing array system according to claim 26, wherein a density of edges of the circular spot shaped transfer electrode is graded.

28. A sensing array system according to claim 21, wherein the second substrate comprises a sphere.

29. A sensing array system according to claim 28, wherein a plurality of transfer electrodes are provided and wherein placement of the transfer electrodes has polyhedral symmetry.

30. A sensing array system according to claim 29, wherein the plurality of transfer electrodes are galvanically isolated from each other.

31. A sensing array system according to claim 21, wherein the first substrate includes a hemispherical hollow portion.

32. A sensing array system according to claim 21, wherein the plurality of interstitially arranged electrodes are further arranged into strings of electrodes comprising a plurality of interconnected electrode pads.

33. A sensing array system according to claim 32, wherein four strings of electrodes are provided in a first direction and four strings of electrodes are provided in a direction intersecting the first direction to form an interstitially arranged matrix.

34. A sensing array system according to claim 33, wherein the interstitially arranged matrix of electrodes is provided in a grounded shielding mesh.

35. A sensing array system according to claim 21, wherein the system comprises a track ball device.

36. A sensing array system according to claim 21, wherein the system comprises a joy stick device.

37. A sensing array system according to claim 21, wherein the system comprises a mouse device.

38. A sensing array system according to claim 37, wherein the first substrate comprises a mouse body and the second substrate comprises a pad on which the mouse body moves relative to.

39. A sensing array system according to claim 21, wherein the system comprises a finger mouse and wherein the second substrate comprises a user's finger.

40. A sensing array system having two axes of sensitivity for determining relative motion, the system comprising:
   a first substrate having a plurality of interstitially arranged electrodes provided thereon; and
   a second substrate having at least one transfer electrode provided thereon, the first and second substrates being movable relative to each other;
   wherein:
      the plurality of interstitially arranged electrodes selectively operate alternatively as driving electrodes for providing a plurality of signals to the sensing array and as collecting electrodes for collecting signals capacitively transferred from the driving electrodes by the at least one transfer electrode;
      the system further comprising a signal generator for generating the plurality of signals that are provided by the driving electrodes to the sensing array, the signal generator generating a number of different phase signals of a same frequency;
      the phases of the different phase signals generated by the signal generator are equally spaced;
      the different phase signals generated by the signal generator comprise an even number of equally spaced phase signals; and
      a product of the number of equally spaced phase signals and a phase difference between the equally spaced phase signals is 360°, to provide phase closure.

41. A sensing array system according to claim 40, further comprising collecting means for collecting a phase information signal from the group of electrodes operating as collecting electrodes, the phase information signal being coupled from the electrodes operating as driving electrodes on the first substrate to the electrodes operating as collecting electrodes also on the first substrate by the at least one transfer electrode provided on the second substrate.

42. A sensing array system according to claim 41, wherein the collecting means comprises a finite modulus counter for measuring a phase difference between a reference signal and the collected information signal, wherein a count modulus of the counter equals a ratio of a frequency of a clock being counted and a frequency of the phase reference signal which gates the counter, the phase closure and the specific count modulus providing range extension beyond that of a finite sensing array.

43. A sensing array system according to claim 42, wherein the count modulus is an integral power of two.

44. A sensing array system according to claim 41, wherein the collecting means comprises a mixer for frequency down-converting the collected phase information signal using first and second local oscillator signals, the second local oscillator signal being time shifted 180° from the first local oscillator signal, the mixer effectively suppressing even harmonics.

45. A sensing array system comprising:
a first substrate having a plurality of electrodes;
a second substrate having a plurality of transfer electrodes;
a mixer for converting a frequency of a signal capacitively transferred between a first one of the plurality of electrodes of the first substrate to a second one of the plurality of electrodes of the first substrate by the transfer electrodes of the second substrate, the mixer multiplying the transferred signal using a pair of complimentary local oscillator signals for suppressing even harmonics in the transferred signal.

46. A direction sensing mouse comprising:
a mouse body having a planar surface including a plurality of excite and sense electrodes arranged in a grid-like pattern;
a pad including a planar surface on which the mouse body is moved relative to, the planar surface of the pad including a plurality of transfer electrodes for transferring signals from the plurality of excite electrodes to the plurality of sense electrodes of the mouse body;
wherein the plurality of excite and sense electrodes are arranged relative to the transfer electrodes so as to enable movement of said mouse body relative to the pad to be sensed in two generally orthogonal directions.

47. The sensing mouse of claim 46, wherein the excite electrodes are generally oriented in a first direction and the sense electrodes are generally oriented in a second direction perpendicular to the first direction, so as to enable movement of the mouse body relative to the pad to be sensed in both the first and second directions.

48. The sensing mouse of claim 46, wherein the excite electrodes comprise a first string of electrodes and the sense electrodes comprise a second string of electrodes intersecting and generally perpendicular to the first string of electrodes.

49. A track ball device, comprising:
a ball having a pattern of transfer electrodes; and
a socket into which the ball sits, the socket having a plurality of electrodes including strings of first electrodes intersecting strings of second electrodes.

50. The track ball device of claim 49, wherein a relationship between the pattern of transfer electrodes and first and second electrodes is such as to enable ball rotation to be sensed in both first and second generally orthogonal directions by electrostatic transfer of signals between electrodes of the strings of first electrodes to electrodes of the strings of second electrodes via at least one of the transfer electrodes when the ball rotates in the socket.

51. The track ball device of claim 49, further including circuitry for operating ones of the first electrodes as driving electrodes while ones of the second electrodes operate as collecting electrodes, and circuitry for operating ones of the second electrodes as driving electrodes while ones of the first electrodes operate as collecting electrodes, to thereby enable ball rotation to be sensed in both first and second generally orthogonal directions.

52. The track ball device of claim 49 wherein each string of electrodes comprises a plurality of interconnected electrode pads.

53. The track ball device of claim 49 wherein the strings of first electrodes are oriented in a first direction and the strings of second electrodes are oriented in a second direction generally perpendicular to the first direction.

54. A sensing array system having two axes of sensitivity for determining relative motion in each of the two axes, the system comprising:
a first substrate having a plurality of interstitially arranged electrodes provided thereon, including a first group of electrodes intersecting a second group of electrodes; and
a second substrate having at least one transfer electrode provided thereon,
wherein the first and second substrates are movable relative to each other and the plurality of interstitially arranged electrodes selectively operate alternatively as driving electrodes for providing a plurality of signals to the sensing array and as collecting electrodes for collecting signals capacitively transferred from the driving electrodes by the at least one transfer electrode, the system further comprising:
a signal generator for generating the plurality of signals that are provided by the driving electrodes to the sensing array, the signal generator generating a number of different phase signals of a same frequency.

55. A sensing array system according to claim 54, wherein the phases of the different phase signals generated by the signal generator are equally spaced.

56. A sensing array system according to claim 55, wherein the different phase signals generated by the signal generator comprise an even number of equally spaced phase signals.

57. A sensing array system having two axes of sensitivity for determining relative motion in each of the two axes, the system comprising:
a first substrate including a hemispherical hollow portion having a plurality of interstitially arranged electrodes provided thereon, including a first group of electrodes intersecting a second group of electrodes; and
a second substrate having at least one transfer electrode provided thereon, wherein the first and second substrates are movable relative to each other.

58. A sensing array system according to claim 57, wherein the interstitially arranged electrodes are provided in a grounded shielding mesh.

59. A sensing array system having two axes of sensitivity for determining relative motion in each of the two axes, the system comprising:
a track ball device comprising:
a first substrate comprising a socket having a plurality of interstitially arranged electrodes provided thereon, including a first group of electrodes intersecting a second group of electrodes; and
a second substrate comprising a ball having at least one transfer electrode provided thereon, said ball being configured to rotatably sit within said socket,
wherein the first and second substrates are movable relative to each other.

60. A sensing array system according to claim 59, wherein said at least one transfer electrode comprises a first plurality of electrodes arranged in a first pattern on said ball, and said plurality of interstitially arranged electrodes comprise a second plurality of electrodes arranged in a second pattern on said socket.

* * * * *